(12) United States Patent
Shelton (10) Patent No.: US 11,966,983 B2
(45) Date of Patent: Apr. 23, 2024

(54) SYSTEMS AND METHODS OF USING MACHINE LEARNING FOR FEE RISK ESTIMATIONS

(71) Applicant: Change Healthcare Holdings, LLC, Nashville, TN (US)

(72) Inventor: Chase Shelton, Mansfield, TX (US)

(73) Assignee: Change Healthcare Holdings, LLC, Nashville, TN (US)

( * ) Notice: Subject to any disclaimer, the term of this patent is extended or adjusted under 35 U.S.C. 154(b) by 0 days.

(21) Appl. No.: 17/831,988

(22) Filed: Jun. 3, 2022

(65) Prior Publication Data
US 2023/0394584 A1    Dec. 7, 2023

(51) Int. Cl.
*G06Q 40/08*    (2012.01)
*G06N 5/022*    (2023.01)

(52) U.S. Cl.
CPC ............ *G06Q 40/08* (2013.01); *G06N 5/022* (2013.01)

(58) Field of Classification Search
CPC ..................................... G06Q 40/08

USPC ............................................................ 705/4
See application file for complete search history.

(56) References Cited

U.S. PATENT DOCUMENTS 10,366,204 B2 *    7/2019    Tanner, Jr. ............. G06Q 40/08

* cited by examiner

*Primary Examiner* — Robert R Niquette
(74) *Attorney, Agent, or Firm* — Meunier Carlin & Curfman LLC (57) ABSTRACT

Machine learning models can assess historical insurance claims data and prescription fulfillment records to reduce paybacks to prescription payers in the form of direct and indirect remuneration fees. A pharmacy computer receives prescription data and communicates at least a portion of the prescription data to a pharmacy benefit manager. The pharmacy computer receives a prescription benefit response back at the computerized application from the prescription payer software application. The pharmacy computer is configured to develop machine learning request data, selected from the prescription data and prescription benefit response data, and send the machine learning request data to machine learning software. The machine learning software calculates payback forecast data for the prescription data.

20 Claims, 10 Drawing Sheets

SYSTEMS AND METHODS OF USING MACHINE LEARNING FOR FEE RISK ESTIMATIONS

BACKGROUND

Machine Learning (ML) and Artificial Intelligence (AI) systems are in widespread use in customer service, marketing, and other industries. Machine learning is considered a subset of more general artificial intelligence operations, and AI endeavors may utilize numerous instances of machine learning to make decisions, predict outputs, and perform human-like intelligent operations. Machine learning protocols typically involve programming a model that instantiates an appropriate algorithm for a given computing environment and training the model on a particular data set or domain with known historical results. The results are generally known outputs of many combinations of parameter values that the algorithm accesses during training. The model uses numerous statistical and mathematical operations to learn how to make logical decisions and generate new outputs based on the historical training data. Machine learning (ML) includes, but is not limited to, a number of models such as neural networks, deep learning algorithms, support vector machines, data clustering, regression models, and Monte Carlo simulations. Other models may utilize linear regression, logistic regression, support vector machines, K-means clustering, classification models such as a binary classifier or a multi-class classifier, clustering models, anomaly detection, other supervised learning models, and even combinations of one or more machine language model types. Most of these take vectors of data as inputs.

The term "artificial intelligence," therefore, includes any technique that enables one or more computing devices or comping systems (i.e., a machine) to mimic human intelligence. Artificial intelligence (AI) includes, but is not limited to, knowledge bases, machine learning, representation learning, and deep learning. The term "machine learning" is generally a subset of AI that enables a machine to acquire knowledge by extracting patterns from raw data.

The term "representation learning" may be used as a subset of machine learning that enables a machine to automatically discover representations needed for feature detection, prediction, or classification from raw data. Representation learning techniques include, but are not limited to, autoencoders.

The term "deep learning" may also be considered a subset of machine learning that enables a machine to automatically discover representations needed for feature detection, prediction, classification, etc. using layers of processing. Deep learning techniques include, but are not limited to, artificial neural network or multilayer perceptron (MLP).

Machine learning models include supervised, semi-supervised, and unsupervised learning models. In a supervised learning model, the model learns a function that maps an input (also known as feature or features) to an output (also known as target or target) during training with a labeled data set (or dataset). In an unsupervised learning model, the model learns a function that maps an input (also known as feature or features) to an output (also known as target or target) during training with an unlabeled data set. In a semi-supervised model, the model learns a function that maps an input (also known as feature or features) to an output (also known as target or target) during training with both labeled and unlabeled data.

Some machine learning models are designed for a specific data set or domain and are highly expert at handling the nuances within that narrow domain. One kind of data that can be enhanced for evaluation with machine learning is insurance data, or more specifically insurance data related to costs of prescription fulfillment for insured patients. In addition to the ever-changing prices of drugs, insurance coverage options, and rules among pharmacy networks, some insurance providers have the authority to charge service providers a later remuneration fee, long after a prescription has been filled. These fees may be due if a service provider who filled the prescription, such as a retail pharmacy, does not comply with accountability rules available to pharmacy benefit managers (PBMs) working on behalf of prescription payers and insurers. These fees are known as direct and indirect remuneration (DIR) fees.

Direct and Indirect Remuneration (DIR) fees originated under federal Medicare laws as a way for PBMs to create accountability for care and service provided by retail pharmacies to their beneficiaries. If retail pharmacies fail to provide a certain level of care and service, based upon previously agreed plan performance metrics, then DIR fees (or monetary claw backs) may be leveraged against payments provided to the retail pharmacy for services rendered in dispensation of the prescription. DIR fees are typically applied 60-90 days after dispensation of the prescription, which effectively prevents the pharmacy from pursuing real-time DIR fee mitigation or accruing efforts. Additionally, in recent years, PBMs have increased overall DIR fee percentages and applied these DIR fees at an increased rate. This combination has caused retail pharmacies to begin losing money on dispensation of prescriptions under some insurers, such as prescriptions filled for Medicare Part D beneficiaries. At this time, retail pharmacies providing services to insurance beneficiaries do not have real-time visibility into DIR fee application and have no opportunity to implement mitigation tactics (e.g. consultation, therapy change, payer change), nor do the pharmacies have the capability to accurately forecast overall DIR fee expenditures (including unpaid prescription claims).

Current pharmacy accounting programs are available for specialty accounts receivable tracking of retail pharmacy payments received from insurers, particularly payments that have been managed via a pharmacy benefit manager (the PBM). The current DIR fee-based reporting solutions available in typical accounting platforms do not meet the retail pharmacy industry needs. The tracking solutions do not forecast DIR fees for unpaid prescription claims, leaving 60-90 days of prescription dispensation out of the forecast model. These models also do not provide real time DIR fee notification to the pharmacy staff during the drug dispensation process. In today's retail pharmacy processes, the pharmacy staff lacks any information about monetary claw backs that might be applied to any insurance claim.

Accordingly, a need exists in the art of prescription fulfillment for pharmacy accounting programs to calculate and display information regarding direct and indirect remuneration fees (DIR fees) charged as claw backs against a retailer. Retail pharmacies need the opportunity for the pharmacy staff to mitigate these DIR fees by suggesting other medications, contacting the prescribing physician to make changes to the prescription, or contacting the pharmacy benefits manager (the PBM) to discern any other options.

BRIEF SUMMARY OF THE DISCLOSURE

In one embodiment, a computer implemented method of reducing paybacks to prescription payers includes steps of receiving prescription data at a computerized application stored in computer memory and implemented by a computer processor. The method communicates at least a portion of the prescription data to a prescription payer software application and receives a prescription benefit response back at the computerized application from the prescription payer software application. The method includes communicating machine learning request data, selected from the prescription data and the prescription benefit response data, to machine learning software and using the machine learning software with the machine learning request data to calculate payback forecast data for the prescription data. Finally, the pharmacy computer 150 receives the payback forecast data 236 at the computerized application 175 to build an output message for a computer display 299.

In another embodiment, an apparatus includes a computer storing a computerized application for receiving prescription data on a computer-readable medium storing computer executable instructions that when executed by the computer cause the computerized application to perform steps, starting with communicating at least a portion of the prescription data to a prescription payer software application. The computer receives a prescription benefit response back at the computerized application from the prescription payer software application. The computer communicates machine learning request data, selected from the prescription data and the prescription benefit response data, to machine learning software. In this way, the computer uses machine learning software with the machine learning request data to calculate payback forecast data for the prescription data. The computer receives the payback forecast data at the computerized application to build an output message for a display connected to the computer.

In another embodiment, a computer-readable medium stores computer-executable instructions that, when executed by the at least one processor, implement a computerized application to receive prescription data at the computerized application and communicate at least a portion of the prescription data to a prescription payer software application. The computer readable medium receives a prescription benefit response back at the computerized application from the prescription payer software application. The computerized application communicates machine learning request data, selected from the prescription data and the prescription benefit response data, to machine learning software. The machine learning software uses the machine learning request data to calculate payback forecast data for the prescription data.

DETAILED DESCRIPTION

Figure 1:
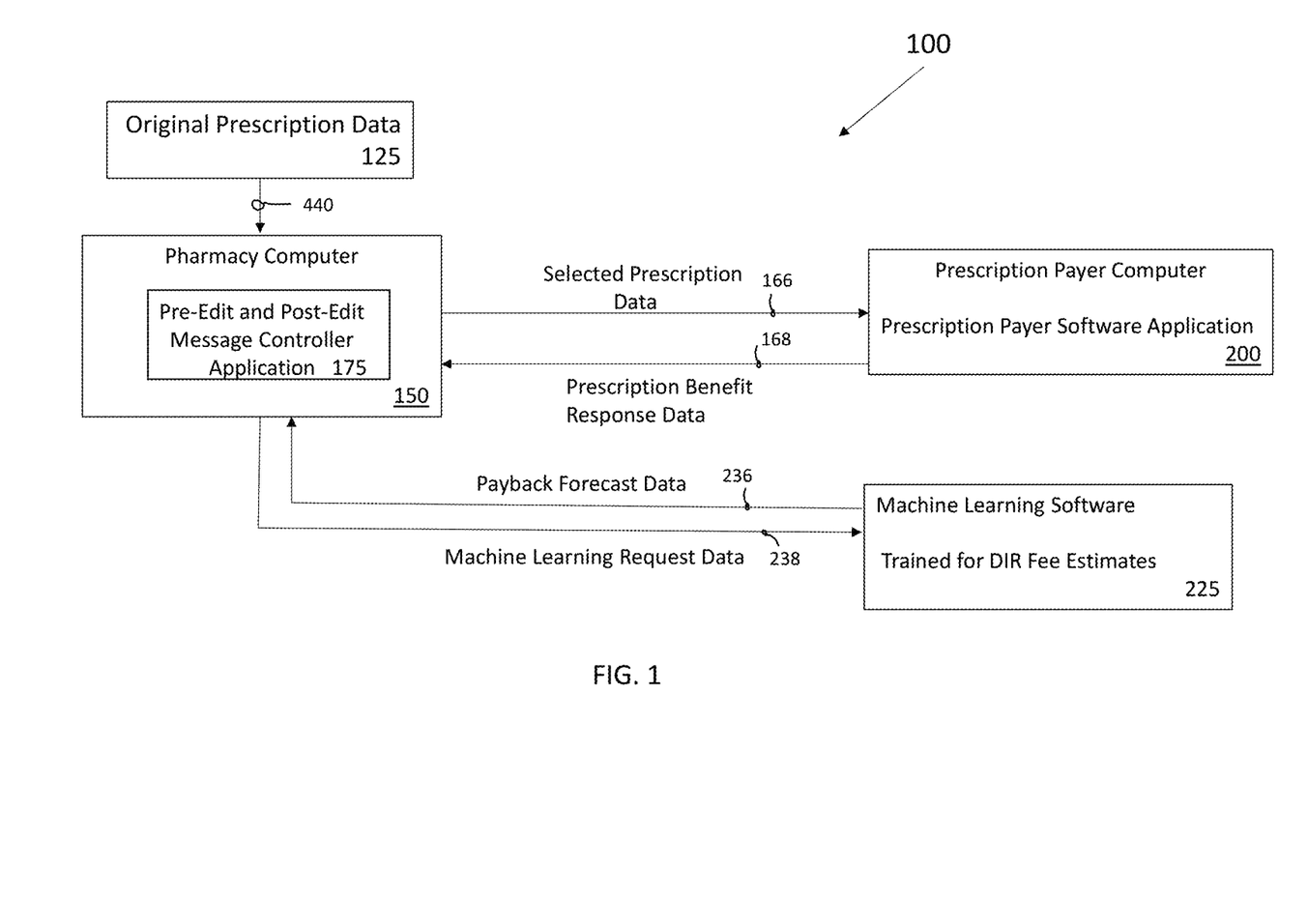
FIG. 1 is a schematic diagram showing an overview environment in which artificial intelligence operations are used to predict risks and amounts of DIR fees for a prescription.
Figure 2:
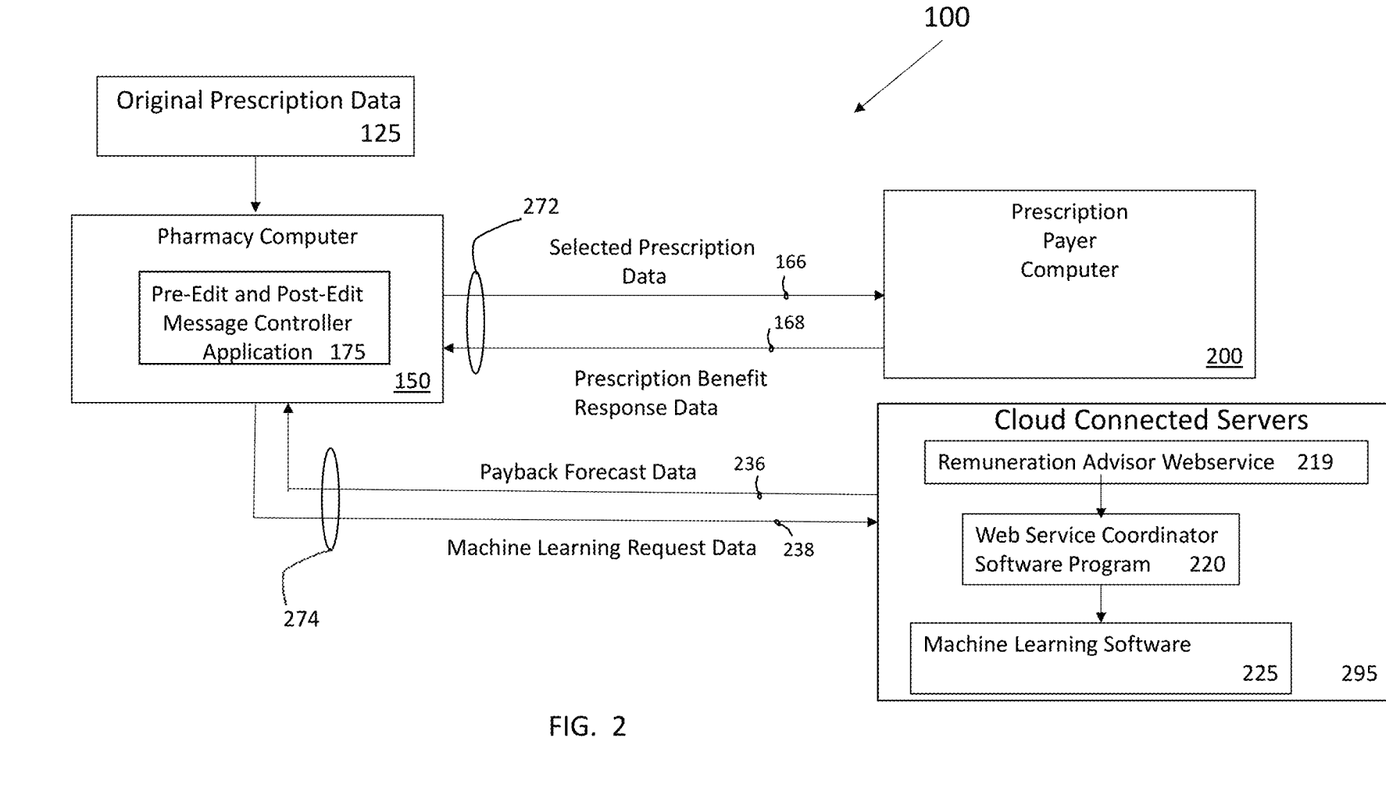
FIG. 2 is a schematic diagram showing an overview environment in which artificial intelligence operations are used to predict risks and amounts of DIR fees for a prescription with machine learning software in a cloud based server environment.
Figure 3:
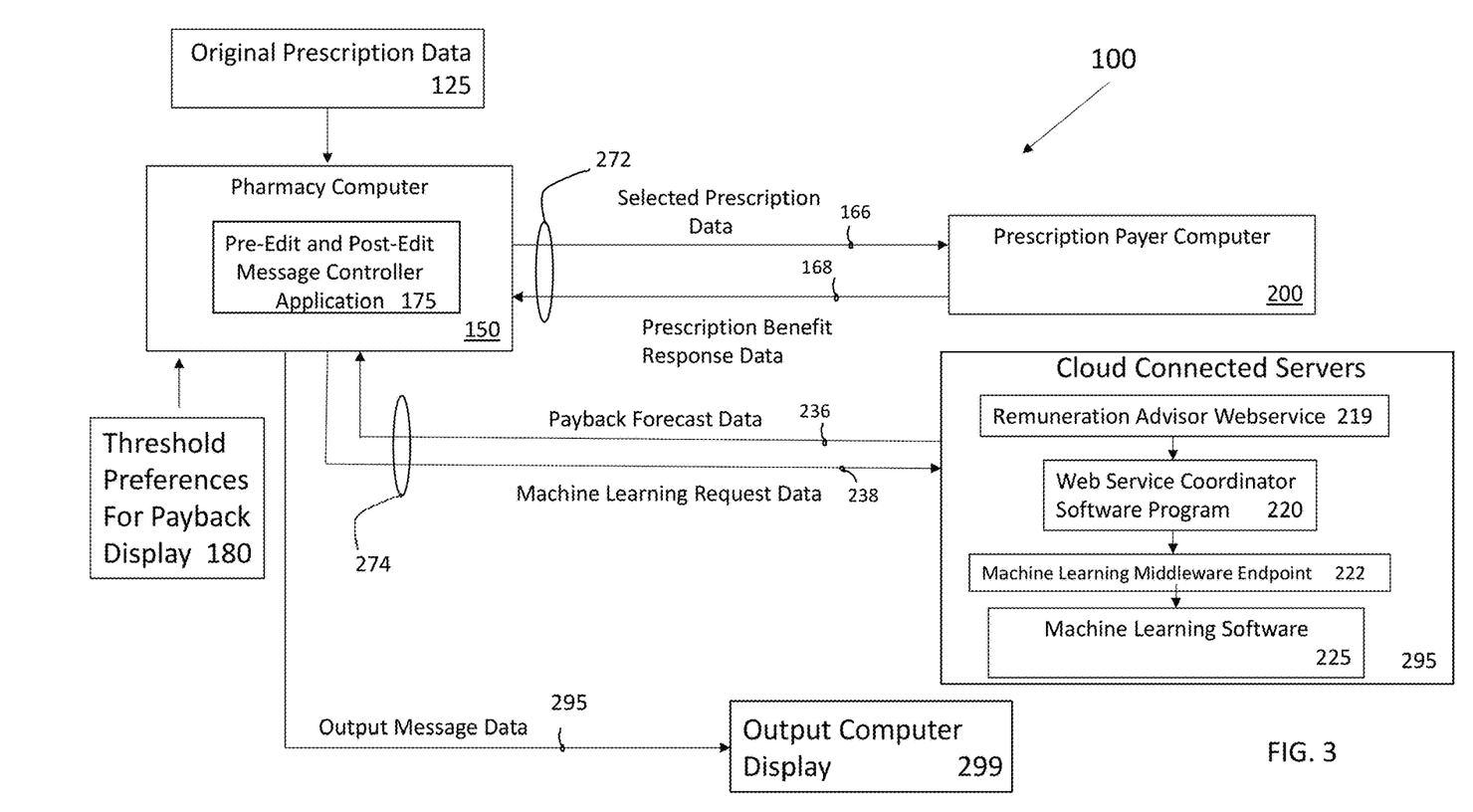
FIG. 3 is a schematic diagram showing an overview environment in which artificial intelligence operations are used to predict risks and amounts of DIR fees for a prescription and displaying an associated message on a pharmacy computer display as set forth herein.

Embodiments of this disclosure may be implemented on numerous computers, servers, mobile devices, and the like that may be configured as a stand-alone apparatuses or as a system implemented on a communications network, so long as the components on the network incorporate sufficient hardware and software to execute the operations described below. FIGS. 1-3 provide an overview of a system 100 for calculating a risk for direct and indirect remuneration fees (DIR fees) and estimate an amount that may eventually be charged to a retail pharmacy that fills a prescription. As noted above, these kinds of charges, or claw backs, may be unknown at the time of prescription fulfillment and payment by the customer. A system as shown in FIGS. 1-3 has the components to execute a computer implemented method of reducing paybacks owed to prescription payers.

Beginning with FIG. 1, a medical provider issues a prescription to a patient, and that prescription either originates in digital form or is converted to a digital prescription that is transmitted to a pharmacy computer 150 with original prescription data 125. The term pharmacy in this disclosure includes any establishment that provides prescription fulfillment services, and although a prescription often requests medications to treat a patient's condition, this disclosure includes all establishments of any kind that fulfill prescriptions for medical equipment, therapies, glasses, dentistry, or any over the counter products covered by insurance in addition to traditional medicines.

Figure 9:
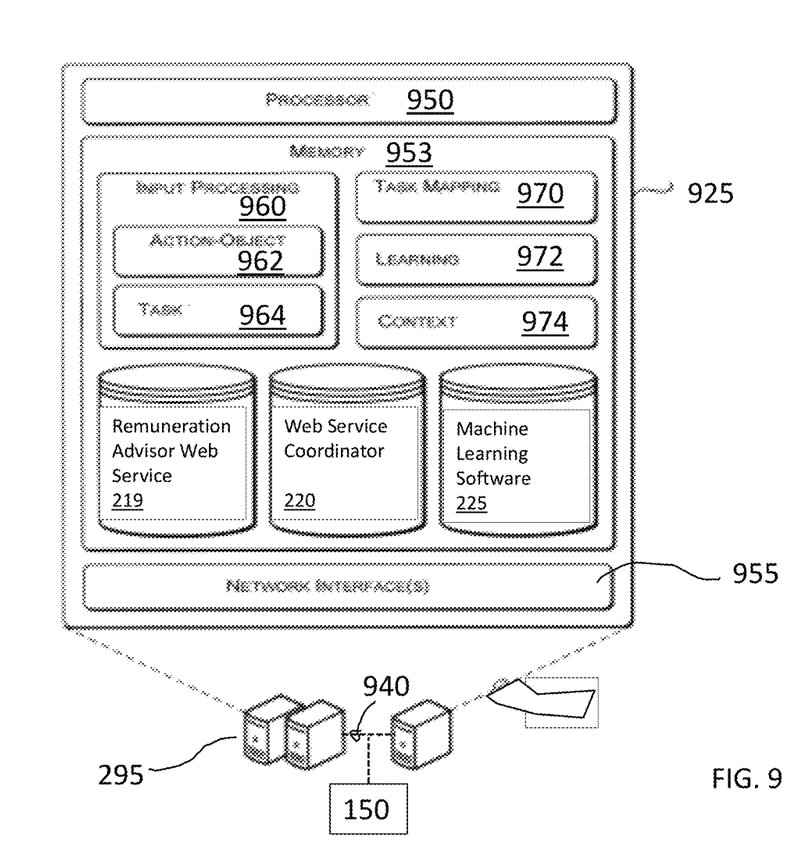
FIG. 9 is a schematic diagram of a cloud connected computer that may be used for machine learning operations in accordance with embodiments of this disclosure.

The pharmacy computer 150 incorporates numerous kinds of hardware and software as disclosed below in relation to FIGS. 9 and 10. The pharmacy computer 150, therefore, not only has its own processing hardware and computerized memory, but it also includes communications hardware and software to allow it to utilize servers and other computers connected over a communications network 440. Accordingly, operations described in this disclosure may encompass cloud computing. The software options on a pharmacy computer 150 may include a message handler and an associated message controller application by which the pharmacy computer 150 manages communications 166, 168, 236, 238 regarding the original prescription data 125 being transmitted to and from other computers. In this regard, the pharmacy computer 150 is described as incorporating a pre-edit and post-edit message controller application ("PPE application") 175 implemented in appropriate computer hardware.

One way to understand this disclosure is to consider how a computer at a pharmacy retail location manages accounting information for each prescription, including the cost of the prescription, the insurance coverage, the amount a patient will pay, and amounts that PBMs may eventually charge back to the pharmacy, under certain circumstances, as DIR fees. As shown in FIGS. 1-3, the PPE application 175 is one aspect of this disclosure that allows the pharmacy computer 150 to handle prescription fulfillment efficiently in real time and address the possible financial claw backs from a payer during a time period in which the patient is available to receive, and pay for, the goods and services.

Without limiting this disclosure, the PPE application 175 may be described in terms of the states of message data available to the pharmacy computer 150 regarding a particular set of original prescription data 125. In other words, one can consider message data at the pharmacy computer to include a message to the computer user that can be relayed to a patient and accounted for in retail pharmacy accounting. Generally, the pharmacy computer 150 has an overall memory 1008 (shown in FIG. 10) to store original prescription data 125 received for a patient, a pre-edit memory 1009A that stores data related to initial calculations of payer reimbursement, and a post-edit memory 1009B that stores additional data related to calculations that estimate the risk and amounts of potential claw backs from the payer (i.e., direct and indirect remuneration fees (DIR) due back to the payer, based on accountability standards). The memory hardware 1008 of FIG. 10 interacts with the pre-edit and post-edit message controller application (the PPE) 175 to provide the pharmacy computer 150, and its operator or user, up-to-date information about the DIR fees likely to be assessed for a particular prescription. One goal of the embodiments of FIGS. 1-3 is to edit the message data available at the pharmacy computer so that the user of the pharmacy computer can account for DIR fees along with insurance coverage and overall costs in fulfilling the prescription.

Figure 7:
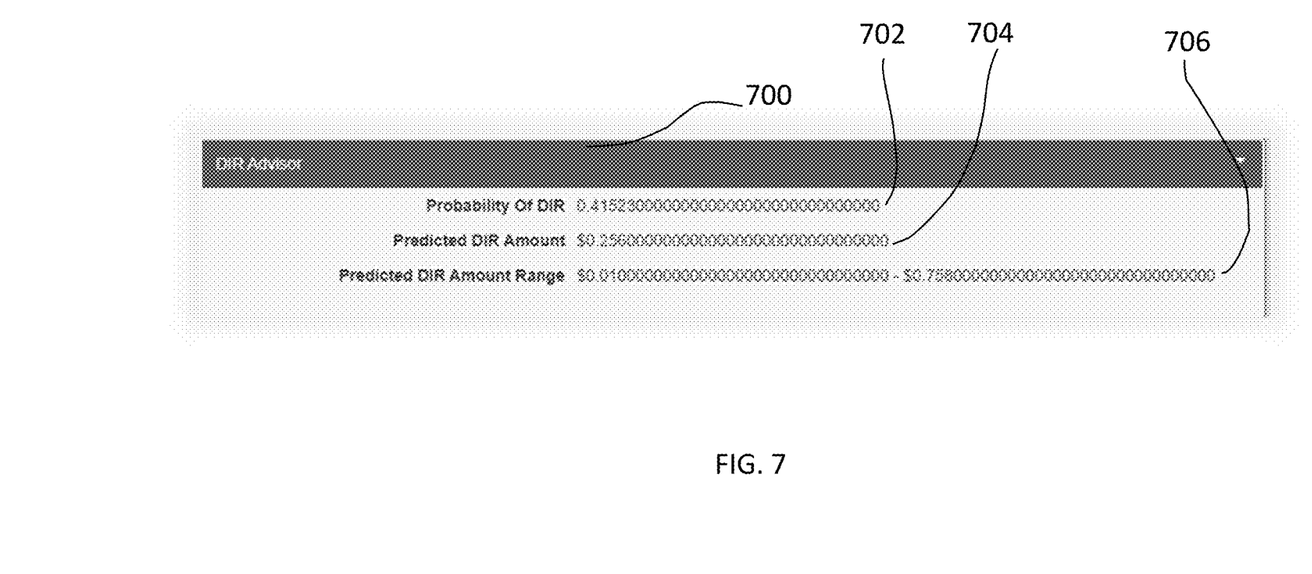
FIG. 7 is an example of message data available to a pharmacy computer regarding probability, amount, and ranges of DIR fees that may accrue to a pharmacy in a given transaction for prescription fulfillment.

As shown in FIGS. 1-3, the pharmacy computer 150 uses stored message data regarding a prescription in a pre-edit exercise to retrieve and assess updated information from a payer computer 200 (i.e., a PBM computer). The pharmacy computer 150 also retrieves and assesses information from a machine learning application software program 225 in a post-edit exercise (i.e., the pharmacy computer retrieves payback forecast data 236 and edits the message data for review at the pharmacy computer in the post-edit exercise). The payback forecast data 236 may include data as shown in FIG. 7, including predicted claw back amounts that a pharmacy may expect to ultimately pay when consummating a given transaction. In other embodiments, this disclosure includes the payback forecast data 236 sent to the pharmacy computer 150 being transmitted in the form of an expected final reimbursement amount to be collected by the pharmacy, instead of a separate drug price and expected claw back by the PBM. In other words, numerous kinds of information can be transmitted back to the pharmacy computer 150 in formats that include expected claw back charges that the pharmacy will face at a certain price charged to the customer or in the form of a final reimbursement amount that a PBM will pay the pharmacy to provide a filled prescription to a customer.

The system 100 shown in the figures includes computer components connected on a network 440 by which original prescription data 125 is transmitted to a pharmacy computer 150 configured to implement messages to a pharmacy computer user regarding prescription costs, insurance coverage, and likely DIR fees associated with that prescription. The pharmacy computer 150 transmits selected prescription data 166 to a prescription payer computer 200, which in non-limiting embodiments may be a PBM computer. The prescription payer computer 200 returns prescription benefit response data 168 back to the pharmacy computer 150. This information is stored in a process that may be considered a pre-edit process because the ultimate message data regarding the overall transaction has not been finalized for use. Instead, the pharmacy computer 150 utilizes the PPE 175 to analyze the original prescription data 125 and the prescription benefit response data 168 to generate machine learning request data 238.

Figure 4:
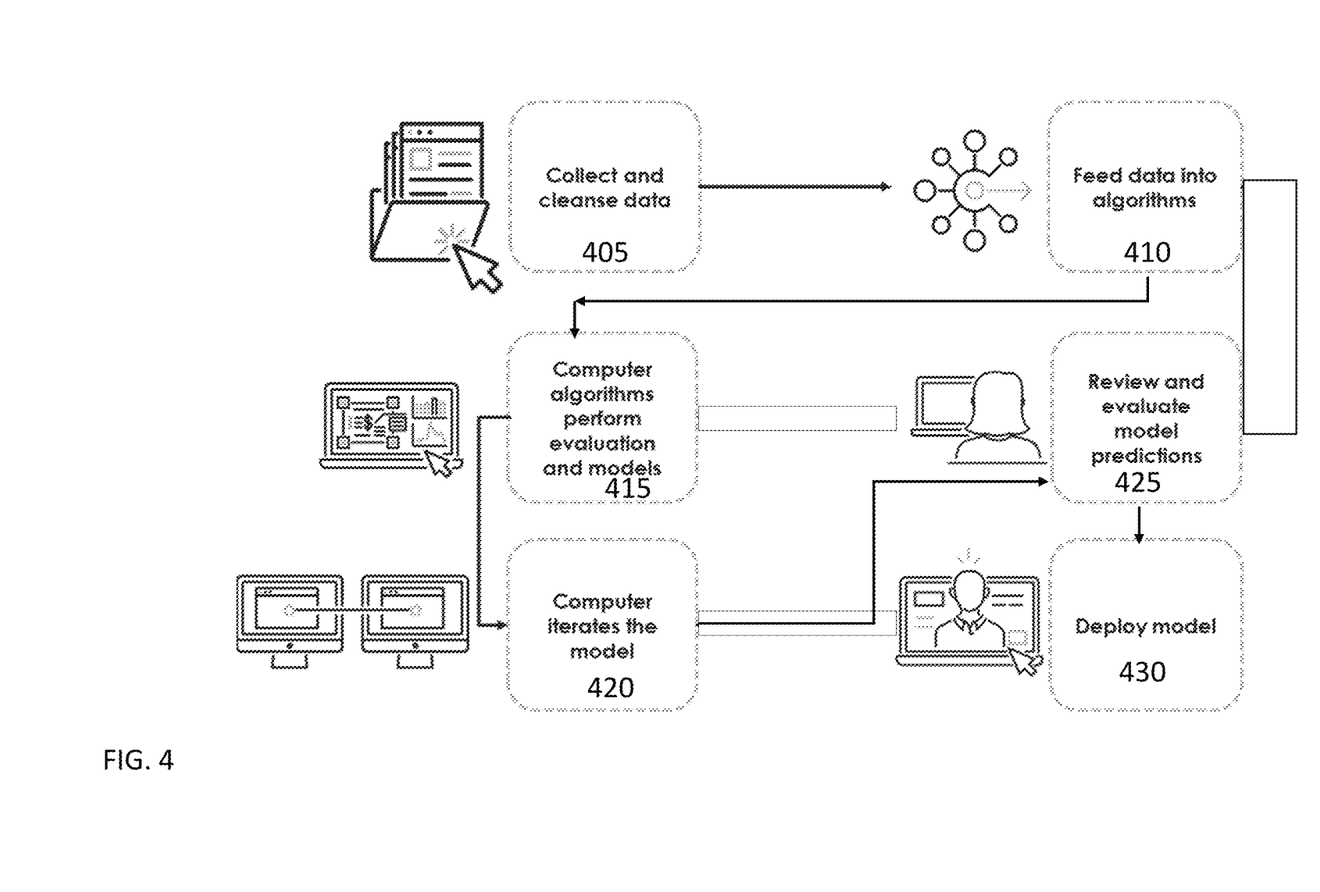
FIG. 4 is a schematic diagram shows an example of steps in training machine learning models as used in various embodiments of this disclosure.

A machine learning request includes data 238 and instructions sent to a machine learning software program 225 for evaluation by a trained machine learning algorithm 430 (shown in FIG. 4). As noted above, training the algorithm includes using historical data to show the algorithm how combinations of parameters and historical inputs used in a given calculation has previously resulted in certain real-world outputs. When the algorithm receives new inputs from new scenarios, the logic in the algorithm can then estimate a likely output that will ultimately match the historical patterns that are already known. In one non-limiting embodiment, this disclosure may be implemented with machine learning software 225 that has been trained with authentic insurance claims records 405 (shown in FIG. 4) that include information regarding prescription fulfillment, financial details of the prescription fulfillment, and the results of insurance participation, including later DIR fees assessed to retailers who filled the prescriptions. For example, and without limiting this disclosure in any way, machine learning algorithms may be trained with data stored in commercial accounting programs such the Absolute AR® solution that have details of millions of records of prescription data, the fulfillment of those prescriptions, and the DIR fees that resulted for each. In one sense, this disclosure includes predicting payback forecast data 236 by locating matches in factual details, data values, and data formats between a transaction at hand and a plurality of records of historical transaction data. The machine learning software allows for this kind of match to search millions of historical records in real time while a pharmacy is filling and selling prescription fulfillment services.

FIG. 4 illustrates one example of steps involved in training machine learning software 225 with claims records from real transactions that include all of the information about historical prescriptions, prescription fulfillment, and DIR fees that resulted from the transactions. The training steps include collecting and scrubbing the records of prescription data and insurance claims 405 before feeding the data into algorithms set forth in the machine learning software 410. The various models used in the machine learning software implement machine learning algorithms and models 415, and a computer, such as a cloud server, iterates through at least one machine learning model 420. The machine learning software presents model predictions and returns DIR fee predictions for the training data 425. After these results are evaluated, the machine learning software model is ready to deploy in live data situations 430.

The pharmacy computer 150 compiles machines learning request data 238 from requisite information taken from the selected prescription data 166 and the prescription benefit response data 168 that has been gathered from the prescription payer computer 200. The machine learning request data 238 is transmitted to the machine learning software 225 which has been trained to predict DIR fee estimates. The machine learning software 225 returns payback forecast data 236 that includes information regarding the risks and amounts of DIR fees being assessed under the current circumstances of a given prescription.

As shown in FIG. 2, connecting the pharmacy computer 150 to the machine learning software 225 may be a cloud-based operation across numerous servers 295. In some scenarios, machine learning software 225 is a proprietary product of a third-party vendor, and this disclosure includes particular software applications developed to tap into the proprietary software. As shown in FIG. 2, the machine learning request data 238 is initially gathered by a remuneration advisor webservice application 219 connected on a network to access the cloud based servers 295. web service coordinator software program 220 may also be utilized to ensure that the machine learning request data is in a proper format for use by the machine learning software. The remuneration advisor webservice 219, the web service coordinator software program 220, and the machine learning software 225, may be on one or multiple computers connected in the cloud.

FIGS. 2 and 3 illustrate how the system 100 has the appropriate components to coordinate communications between a pharmacy computer 150, a prescription payer computer 200, and at least one network computer implementing machine learning software 225. This assembly of computers allows a user to receive real time estimates 700 of the risks and amounts of DIR fees that are likely to be assessed at a later date in regard to a prescription being filled at the moment. An example message is shown in FIG. 7. In general terms, the pharmacy computer 150 uses a pre-edit transmit function 272 to communicate at least a portion of the original prescription data 125 to a prescription payer software application and to receive prescription benefit response data 168 back at the PPE computerized application 175. That is followed by a post-edit request function 274 to communicate the machine learning request data 238 to the remuneration advisor webservice 219 in a JSON POST action.

Turning to FIG. 3, the pharmacy computer 150 receives the original prescription data 125, the prescription benefit response data 168, and the payback forecast data 236 as described in the above discussion. With this data available at the retail pharmacy, the pharmacy computer 150 is equipped to generate output message data 295 for display on an output computer display device 299 (i.e., a monitor, terminal screen, hand-held device, smart phone, etc.). The pharmacy computer 150 may also be equipped with threshold values 180 and hardware for threshold preference data entry via a graphical user interface or an application interface so that the retail pharmacy can determine when DIR fees are sufficiently significant to merit action at the pharmacy. The data types for the threshold values 180 include, but are not limited to, a retail pharmacy's level of risk tolerance, a dollar amount threshold, therapeutic classes to target, and overall costs of a medication that makes DIR fees more relevant. These kinds of parameters can be set to trigger a DIR analysis only when a relevant threshold is met. In some embodiments, the system 100 would only trigger DIR fee predictions for preferred or high-risk situations. For instances of prescription fulfillment that meet the criteria, the system 100 accurately identifies the DIR fees in real time, allowing a pharmacy to implement DIR fee reduction tactics such as trying a different medication, calling a physician for a prescription change, or working with an insurer and its PBM to lower the DIR fees. In most events, the system 100 returns the predictions with data for risk of DIR fees, amount of DIR fees, and/or reason for DIR fees.

Figure 5:
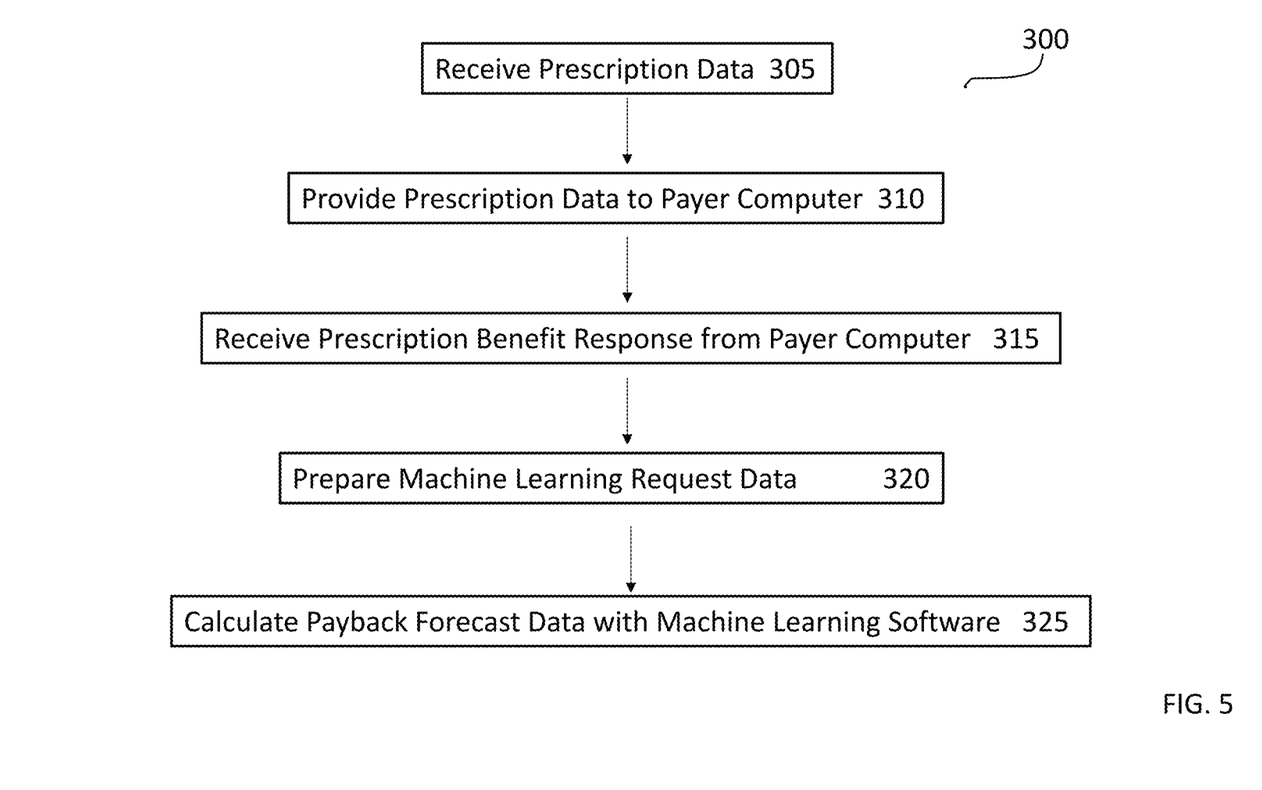
FIG. 5 is a flow chart of example steps in a computer implemented method of using machine learning in the context of predicting direct and indirect remuneration fees.
Figure 6:
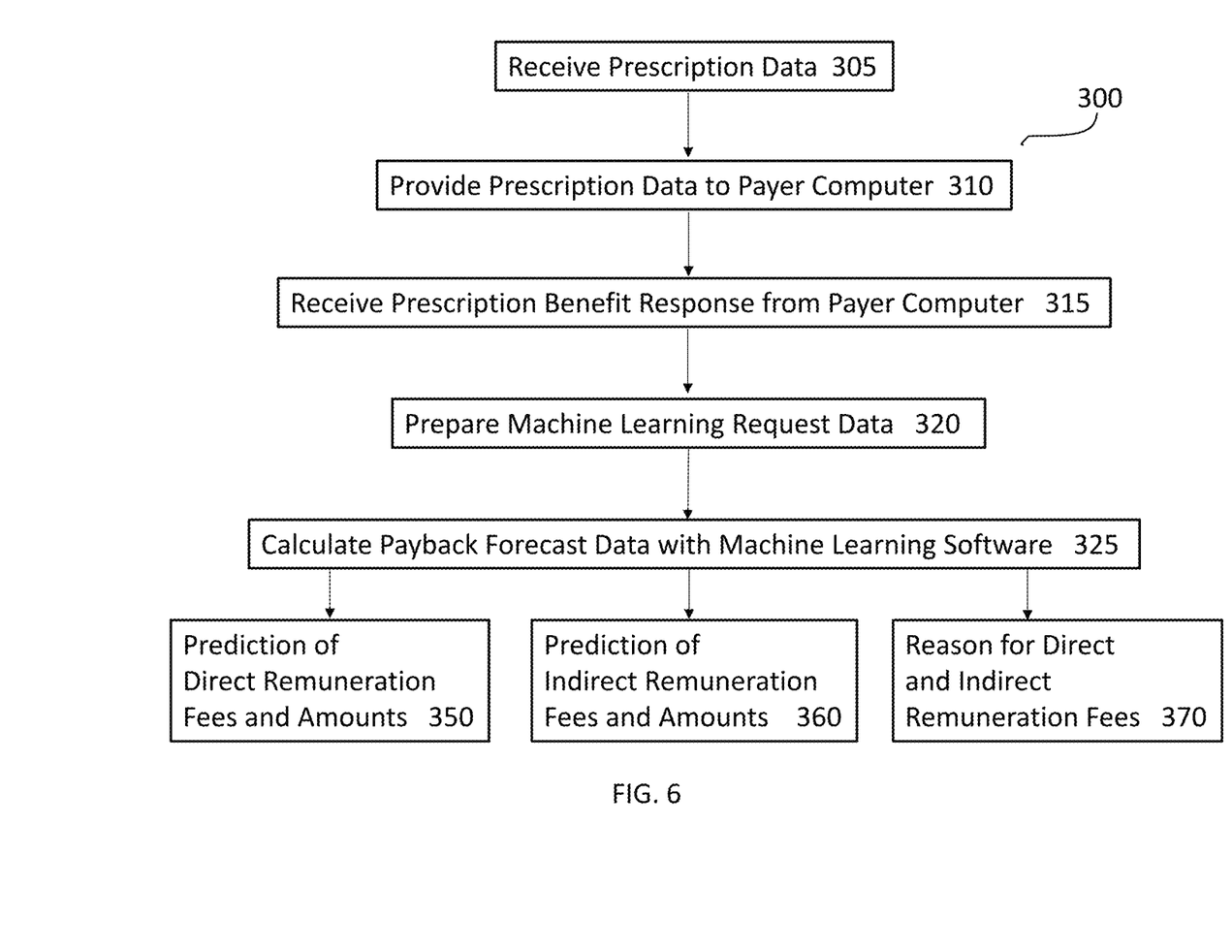
FIG. 6 is a flow chart of steps in a computer implemented method of using machine learning software to predict risks, amounts, and reasons for DIR fees in prescription fulfillment operations.

FIGS. 5 and 6 illustrate steps of a computer implemented method 300 of reducing paybacks to prescription payers by using the system 100 described in the above discussion. The method may be used to predict DIR fees in accordance with this disclosure. Beginning with FIG. 5, the method includes receiving prescription data 305 at a computerized application stored in computer memory and implemented by a computer processor. The method continues by communicating at least a portion of the prescription data to a prescription payer software application 310. Next, the steps include receiving a prescription benefit response back at the computerized application from the prescription payer software application 315, preparing and communicating machine learning request data, selected from the prescription data and the prescription benefit response, to machine learning software 320, and using the machine learning software with the machine learning request data to calculate payback forecast data for the prescription data 325.

A webservice coordinator software program 220 receives the machine learning request data 238 from the computerized application and directs the communications to the learning software. In some embodiments, the webservice coordinator software program and the machine learning software are implemented on cloud connected network servers. The webservice coordinator software program 220 is configured to confirm accuracy of machine learning request data prior to transmitting the machine learning request data to the machine learning software program. In other non-limiting embodiments, the webservice coordinator software program transmits the machine learning request data to a machine learning middleware endpoint 222 shown in FIG. 3 in data communication with the machine learning software 225. Transmitting the machine learning request data may include transmitting the machine learning request data to the webservice coordinator software program 220 in predetermined message types that include routing information for responses. Communicating machine learning request data from the PPE on the pharmacy computer 150 may further include communicating the machine learning request data to a remuneration advisor webservice 219 implemented in a cloud-based network of servers.

The pharmacy computer 150 may use the pre-edit transmit function 272 to communicate at least a portion of the original prescription data 125 to a prescription payer software application on a prescription payer computer 200 to receive prescription benefit response data 168 back at the computerized application. The pharmacy computer is in communication with a remuneration advisor webservice 219 that calls the machine learning software 225 upon receiving the post edit request function 274 from the pharmacy computer with the machine learning request data. FIG. 6 illustrates additional steps in the computerized method by which the system 100 and the associated method 300 calculate payback forecast data 236 with machine learning software 225 (at Step 325). This payback forecast data includes additional information shown in FIG. 6 in which a message to the pharmacy computer user includes information regarding a prediction of direct remuneration fees and amounts 350, prediction of indirect remuneration fees and amounts 360 and reasons for direct and indirect remuneration fees 370. This disclosure also incorporates options for numerous kinds of reports and record keeping 800 as set forth in FIGS. 7-8.

FIG. 7 is an illustration of an example output message 700 from machine learning software 225 that has used machine learning request data 238 to calculate payback forecast data 236 for a set of prescription data 125. In one non-limiting embodiment, a computerized application (e.g., the pre-edit and post-edit message controller application 175) at the pharmacy computer 150 receives payback forecast data 236 to build an output message 700 for a display 299 connected to the pharmacy computer 150. This output message 700 may be configured in numerous ways so long as the pharmacy computer 150 and/or a user of the pharmacy computer has sufficient information to address DIR payments associated with a given transaction. The example output message 700 shown in FIG. 7 includes, but is not always limited to, an estimated probability 702 of a DIR claw back being assessed for the transaction, a predicted DIR amount 704, and/or a predicted DIR amount range 706 showing best and worst case estimates. Including the range 706 allows for the user to have a better risk assessment even if the predicted DIR amount is incorrect as originally calculated. The machine learning software 225 may include the above-described thresholding operations to ensure that low risk assessments of DIR do not hinder transactions unnecessarily. The machine learning software 225 may also include error analysis algorithms that are evaluated during training of the artificial intelligence so that the estimated ranges are as correct as possible.

Figure 8:
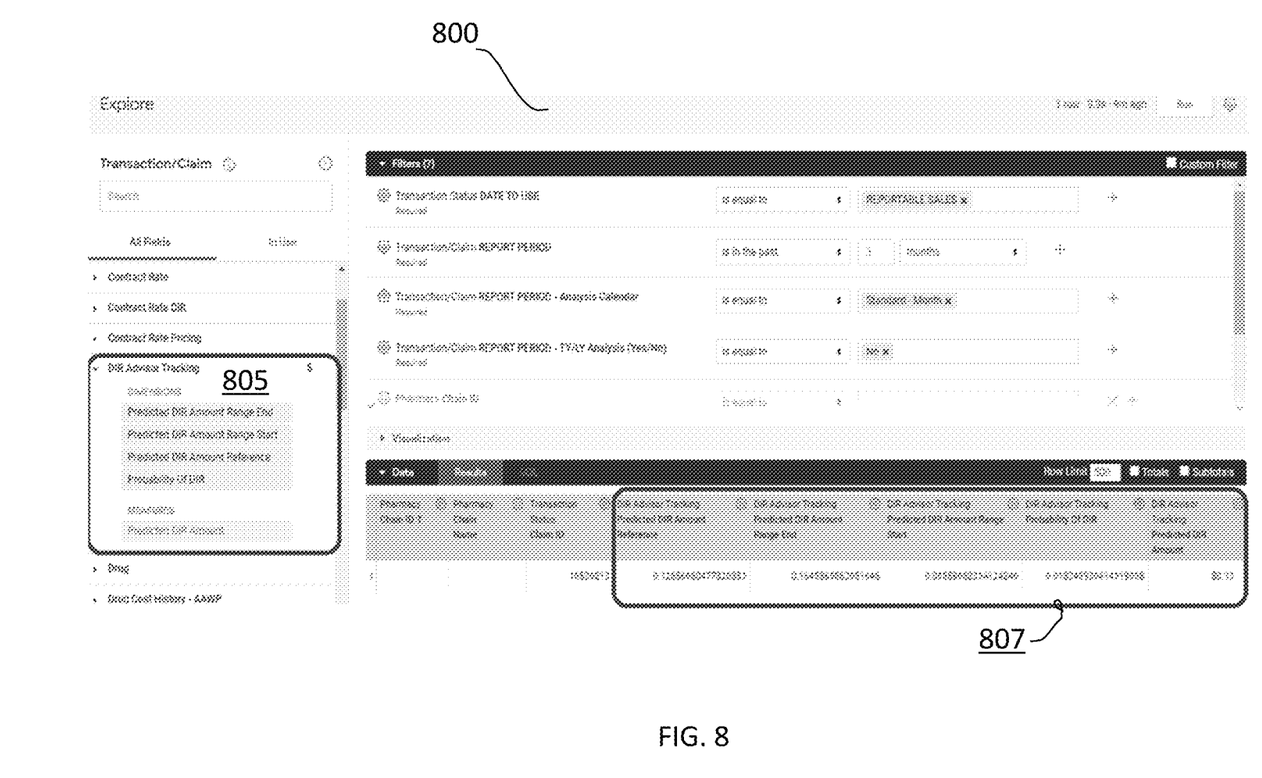
FIG. 8 is an example of message data and report data available to a pharmacy computer regarding probability, amount, and ranges of DIR fees that may accrue to a pharmacy in a given transaction for prescription fulfillment.

FIG. 8 illustrates more detailed reporting 800 that can be tailored to a use at hand by querying records stored in computerized memory associated with the machine learning software 225 and/or the pharmacy computer 150. Numerous instances of the computerized memory may be available on local pharmacy servers and cloud computers to store historical transaction data regarding DIR fees for individual transactions, objective data and parameters associated with respective transactions, training data available to the machine learning software 225, and prescription fulfillment information for completed transactions. FIG. 8 illustrates how custom reports are available for all kinds of records for individual pharmacy locations, pharmacy chains, transaction dates, respective medications, and the like. FIG. 8 is one example of a report but is not limiting of the formats or content available for numerous reporting functions. In the example shown, the report includes numerous drop-down filtering options 805 that result in corresponding query results 807 that are displayed on a computer or printed at the option of the user.

In some embodiments, the pharmacy computer 150 may be considered an apparatus that includes a computer storing a computerized application for receiving original prescription data 125. In other embodiments, the computerized application may be the above-described pre-edit and post-edit message controller application (the "PPE application") 175. A computer-readable medium stores computer executable instructions that, when executed by the computer, cause the computerized application to implement a computerized method 300 including steps to communicate at least a portion of the original prescription data 125 as selected prescription data 166 to a prescription payer software application on a prescription payer computer 200 and receive prescription benefit response data 168 back at the computerized application from the prescription payer software application. The apparatus communicates machine learning request data 238, selected from the original prescription data 125 and the prescription benefit response data 168, to machine learning software 225 and uses the machine learning software with the machine learning request data 238 to calculate payback forecast data 236 for the original prescription data 125. One goal of this operation is to receive payback forecast data 236 at the computerized application 175 to build output message data 295 for a display 299 connected to the pharmacy computer 150. The payback forecast data 236 includes respective predictions for risk of direct and indirect remuneration fees (DIR fees), amounts of direct and indirect remuneration fees, and/or reason for direct and indirect remuneration fees. As set forth in FIG. 4, the apparatus stores the payback forecast data, the prescription data, and the prescription benefit response in a training database for future use.

Embodiments of this disclosure further include a computer-readable medium storing computer-executable instructions that when executed by the at least one processor implement a computerized application, including but not limited to the PPE 175, to receive prescription data 125 at the computerized application, communicate at least a portion of selected prescription data 166 to a prescription payer software application operating on a prescription payer computer 200, receive a prescription benefit response 168 back at the computerized application from the prescription payer software application; communicate machine learning request data 238, selected from the prescription data 125 and the prescription benefit response data 168, to machine learning software 225; and use the machine learning software 225 with the machine learning request data to calculate payback forecast data 236 for the prescription data. The pharmacy computer 150 receives the payback forecast data 236 at the computerized application (i.e., the PPE 175) to build an output message 295 for a computer display 299. Data entry applications in communication with the pharmacy computer may be programmed to receive selectable thresholds 180 into the computerized application and build the output message with the payback forecast data after evaluating the thresholds. The pharmacy computer 150 may be configured with hardware for displaying the output message on the computer display 299 with recommendations for reducing payback fees.

Example Implementation in the Absolute AR® Solution

In one non-limiting example, the automated DIR risk and fee estimator utilizes a third-party machine learning platform and deployed model(s) to interrogate specific field values from retail pharmacy Medicare Part D prescription claim submissions to a PBM and specific field values from the PBM prescription claim response to the retail pharmacy. The DIR risk and fee estimator subsequently identifies a DIR fee probability value (referred to as a risk) and DIR fee monetary value (referred to as an amount). Two front-end applications interact with the DIR risk and fee estimator solution through a cloud-hosted API instance, by passing certain claim submission and response parameters to the deployed machine learning models, then receiving DIR related parameters as output. These DIR related parameters are then displayed on a computer utilizing the a network driven Pre and Post Editing application.

The system in this non-limiting example implements the Network Pre and Post Edit application 175, which is a rules processing engine with capability to return real-time messages to retail pharmacies within their workflow (i.e., during the prescription fulfillment process). A third party web service instance interacts with the DIR fees prediction API gateway. The pharmacy computer 150 calls the third party web service 220 and displays a response 295 to the retail pharmacy as a real-time post edit message. The new Post Edit has specific configurable thresholds 180 available to the retail pharmacy, which will allow them to custom tailor which paid PBM prescription responses display in the pharmacy management system for action.

From a user's perspective, two different user profiles may interact with the system solution:
1. A corporate retail pharmacy representative may utilize accounting applications to accurately forecast DIR fee accruals for a given fiscal month, quarter and/or year. Additionally, these users may have access to records providing the user with capability to build custom DIR related reporting 800. In this scenario, users can leverage DIR values predicted by the system to explore the nature of DIR applications by various PBMs or benchmark their retail pharmacy against other retail pharmacies in the same region or having the same store count and/or size.
2. A store-based retail pharmacy representative may use a pharmacy computer 150 to interact with the Network Pre and Post Edit application 175 during their standard pharmacy workflow. In this scenario, the representative will submit a Medicare Part D prescription to the PBM (i.e., the prescription payer computer 200) and obtain a payment response 168 from the PBM. The Network Pre and Post Edit application 175 will append the predicted DIR risk and DIR fee value amounts, from the prescription benefit response data 168, to the PBM messaging response formed from prescription benefit response data 168. This messaging response may be displayed in the pharmacy management system on an output computer display 299 so that the representative may engage in DIR fee mitigation tactics developed by the retail pharmacy. These mitigation tactics may be, but are not limited to, a patient consultation, a change of drug therapy, and/or a change of payer.

The present disclosure has been described with reference to example embodiments; however, persons skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

The present disclosure has been described with reference to example embodiments, however, persons skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

It is also important to note that the construction and arrangement of the elements of the system as shown in the preferred and other exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability.

Accordingly, all such modifications are intended to be included within the scope of the present disclosure. Other substitutions, modifications, changes, and omissions may be made in the design, operating conditions, and arrangement of the preferred and other exemplary embodiments without departing from the spirit of the present subject matter.

In example implementations, at least some portions of the activities may be implemented in software provisioned on a computer connected to other computers on a network. In some embodiments, one or more of these features may be implemented in computer hardware, provided in cloud based computing networks, or consolidated in any appropriate manner to achieve the intended functionality. In still other embodiments, these elements may include any suitable algorithms, hardware, software, components, modules, interfaces, or objects that facilitate the operations thereof. FIG. 9 illustrates one example of a computer 925 connected to other computers on a data communications network 940. This example of a networked device presents a non-limiting arrangement of the computer infrastructure that can be used in conjunction with the DIR fee assessment system of this disclosure. For example, cloud connected servers 295 may be configured with network interfaces 955 for data communications with pharmacy computers 150 or other entities communicating on the network. FIG. 9 also includes references to numerous computerized components that interact to result in the DIR fee processes discussed herein (i.e., at least one computer processor 950 in data communication with computerized memory 953 incorporating software that accepts inputs and outputs 960 of all types for use in action-object processes 962, task based processing 964, task mapping 970, learning and training for artificial intelligence 972, and even adapting results to particular contexts 974 withing machine learning algorithms). A network interface 955 accepts data inputs from remote entities (such as an application interface gateway) for processing by the above-described remuneration advisor web service 219, a web service coordinator 220, and machine learning software 225. These components are the kinds of computer hardware that may be utilized in both local and cloud-based data processing in numerous embodiments of this disclosure.

Figure 10:
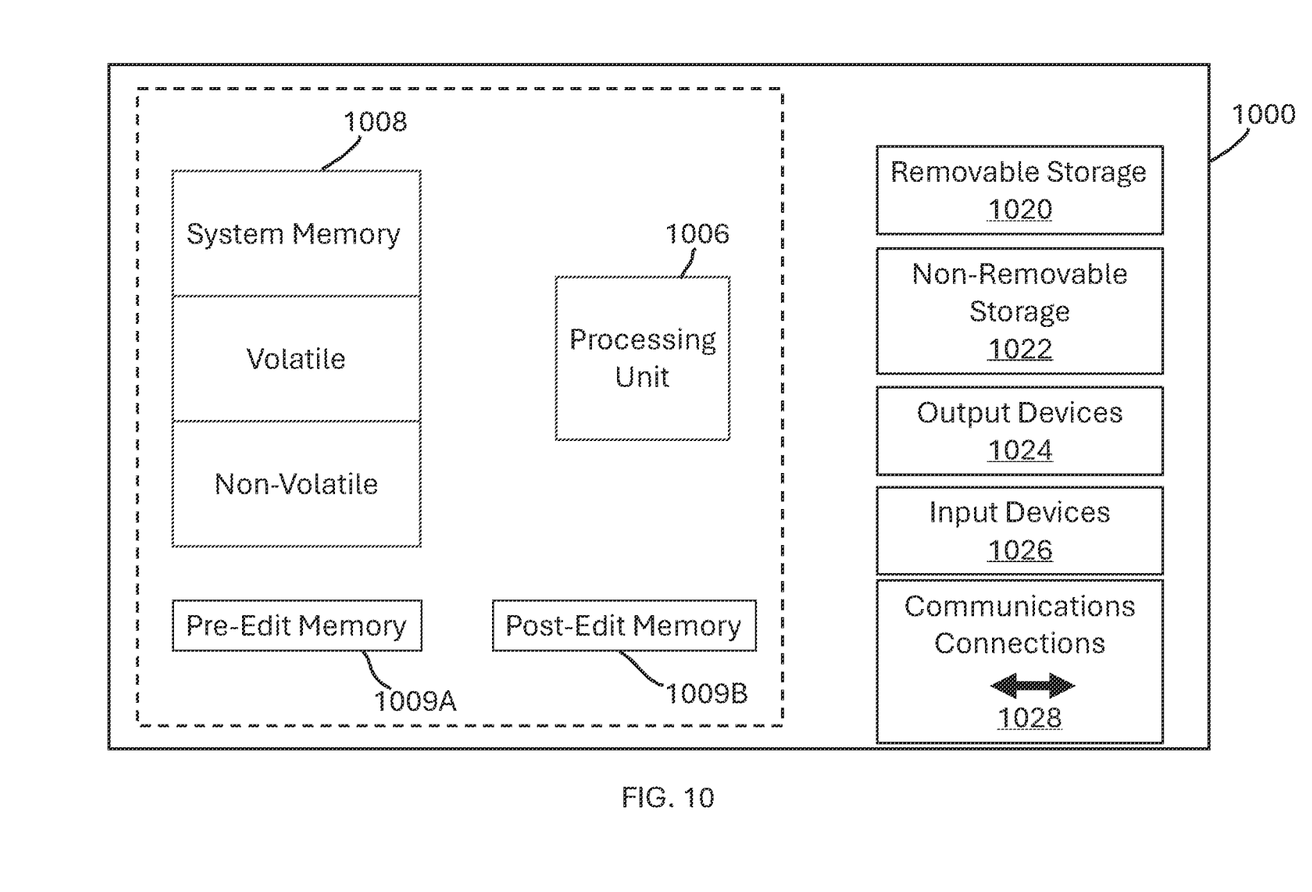
FIG. 10 is a schematic diagram of a computer environment for operations discussed in this disclosure.

FIG. 10 illustrates more examples of computer hardware that may be used in conjunction with network applications that implement DIR fee assessment as well. In certain non-limiting embodiments, for example, a pharmacy computer 150, and even remote computers processing machine learning algorithms, may have special purpose arrangements 1000 of computer equipment sufficient to suit the needs of DIR fee processing. Again, computer hardware typically includes a processing unit 1006 (e.g., a CPU) and system memory 1008 (i.e., volatile memory and non-volatile memory). As discussed above, in one embodiment, the system memory of a pharmacy computer 150 may include pre-edit memory 1009A for storing message data prior to processing by machine learning software and a post-edit memory 1009B for storing data after the machine learning software has been utilized to build appropriate DIR messages to a user. Other optional components of many computers include removable storage 1020, non-removable storage 1022, output devices 1024, input devices 1026, and communication connections 1028. This list is not exhaustive, and numerous computer hardware arrangements are within the scope of this disclosure.

Furthermore, computer systems described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that single processor and a single memory element are responsible for certain activities. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some example embodiments, one or more memory elements (e.g., memory can store data used for the operations described herein. This includes the memory being able to store instructions (e.g., software, logic, code, etc.) in non-transitory media, such that the instructions are executed to carry out the activities described in this Specification. A processor can execute any type of computer-readable instructions associated with the data to achieve the operations detailed herein in this Specification. In one example, processors (e.g., processor) could transform an element or an article (e.g., data) from one state or thing to another state or thing. In another example, the activities outlined herein may be implemented with fixed logic or programmable logic (e.g., software/computer instructions executed by a processor), and the elements identified herein could be some type of a programmable processor, programmable digital logic (e.g., a field-programmable gate array (FPGA), an erasable programmable read only memory (EPROM), an electrically erasable programmable read only memory (EEPROM)), an ASIC that includes digital logic, software, code, electronic instructions, flash memory, magnetic or optical cards, other types of machine-readable mediums suitable for storing electronic instructions, or any suitable combination thereof.

These devices may further keep information in any suitable type of non-transitory storage medium (e.g., random access memory (RAM), read-only memory (ROM), field-programmable gate array (FPGA), erasable programmable read-only memory (EPROM), electrically erasable programmable ROM (EEPROM), etc.), software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.'

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer implemented method comprising:
communicating, by one or more processors, at least a portion of prescription data stored in a first portion of memory, to a prescription payer software application;
receiving, by the one or more processors and in response to the communicating, prescription benefit response data from the prescription payer software application;
storing, by the one or more processors, the prescription benefit response data in the first portion of the memory;
generating, by the one or more processors, machine learning request data from the prescription data and the prescription benefit response data for input into a machine learning model that is trained to predict payback forecast data corresponding to the machine learning request data and based on historical prescription data and historical payback data;
storing, by the one or more processors, the payback forecast data predicted by the trained machine learning model in a second portion of the memory; and
generating, by the one or more processors, an output message for a computer based on the payback forecast data satisfying a configurable threshold.

2. The computer implemented method of claim 1, further comprising communicating the machine learning request data to a webservice coordinator software program in data communication with the machine learning model, wherein the webservice coordinator software program and the machine learning model are implemented on cloud connected network servers.

3. The computer implemented method of claim 2, further comprising confirming accuracy of the machine learning request data with the webservice coordinator software program prior to transmitting the machine learning request data to the machine learning model.

4. The computer implemented method of claim 3, wherein the webservice coordinator software program transmits the machine learning request data to a machine learning middleware endpoint in data communication with the machine learning model.

5. The computer implemented method of claim 4, wherein transmitting the machine learning request data comprises transmitting the machine learning request data to the webservice coordinator software program in predetermined message types that include routing information for responses.

6. The computer implemented method of claim 1, wherein communicating machine learning request data comprises communicating the machine learning request data to a remuneration advisor webservice implementing the machine learning model in a cloud-based network of servers.

7. The computer implemented method of claim 6, further comprising using the one or more processors to implement a pre-edit transmit function and a post-edit request function.

8. The computer implemented method of claim 7, further comprising using the pre-edit transmit function to communicate at least a portion of the prescription data to a prescription payer software application and to receive a prescription benefit response from the prescription payer software application.

9. The computer implemented method of claim 7, further comprising using the post-edit request function to communicate the machine learning request data to the remuneration advisor webservice in a JSON POST action.

10. The computer implemented method of claim 9, further comprising using the post-edit request function to initiate a remuneration advisor webservice call to the machine learning model.

11. The computer implemented method of claim 10, further comprising using the remuneration advisor webservice to format the machine learning request data for use with the machine learning model.

12. The computer implemented method of claim 1, further comprising, after calculating the payback forecast data for the prescription data, returning direct and indirect remuneration (DIR) fee data.

13. The computer implemented method of claim 12, further comprising returning the DIR fee data for risk of DIR fees, amount of DIR fees, and/or reason for DIR fees and using the one or more processors to determine mitigation procedures to reduce the DIR fees.

14. The computer implemented method of claim 1, further comprising transmitting the payback forecast data to a web service coordinator software program and using the web service coordinator program to build the output message with the payback forecast data.

15. An apparatus comprising:
a computer storing prescription data;
a computer-readable medium storing computer executable instructions that when executed by the computer cause the computer to:
communicate, by one or more processors, at least a portion of the prescription data stored in a first portion of memory, to a prescription payer software application;
receive by the one or more processors, a prescription benefit response from the prescription payer software application;
storing, by the one or more processors, the prescription benefit response data in the first portion of the memory;
generate with the one or more processors machine learning request data from the prescription data and the prescription benefit response, for input into a machine learning model that is trained to predict payback forecast data corresponding to the machine learning request data and based on historical prescription data and historical payback data;
storing, by the one or more processors, the payback forecast data predicted by the trained machine learning model in a second portion of the memory; and
generating, by the one or more processors, an output message for a computer display based on the payback forecast data satisfying a configurable threshold.

16. The apparatus of claim 15, further comprising returning, within the payback forecast data, respective predictions for risk of direct and indirect remuneration (DIR) fees, amount of direct and indirect remuneration (DIR) fees, and/or reason for direct and indirect remuneration (DIR) fees.

17. The apparatus of claim 15, further comprising storing the payback forecast data, the prescription data, and the prescription benefit response in a training database.

18. A computer-readable medium storing computer-executable instructions that when executed by the at least one processor implement a computerized application to:
communicate with the at least one processor at least a portion of the prescription data stored in a first portion of memory to a prescription payer software application;
receive by the at least one processor a prescription benefit response from the prescription payer software application;
generate, with the at least one processor, machine learning request data, from the prescription data and the prescription benefit response, for input to a machine learning model that is trained to predict payback forecast data corresponding to machine learning request data based on historical prescription data and historical payback data;
storing, by the one or more processors, the payback forecast data predicted by the trained machine learning model in a second portion of the memory; and
generate, by the one or more processors, an output message for a computer display based on the payback forecast data satisfying a configurable threshold.

19. The computer-readable medium of claim 18, further comprising data entry applications programmed to receive the configurable thresholds and building the output message with the payback forecast data after evaluating the thresholds.

20. The computer-readable medium of claim 19, further comprising displaying the output message on the computer display with recommendations for reducing payback fees.

* * * * *